April 23, 1968  W. E. BELL  3,379,575
BATTERY HAVING A COVER MEMBER FOR A PLURALITY
OF VENTED BATTERY CAPS
Filed Sept. 13, 1965

INVENTOR.
William E. Bell
BY
J.C. Evans
His Attorney

United States Patent Office 3,379,575
Patented Apr. 23, 1968

---

3,379,575
BATTERY HAVING A COVER MEMBER FOR A PLURALITY OF VENTED BATTERY CAPS
William E. Bell, Berkley, Mich., assignor to General Motors Corporation, Detroit, Mich., a corporation of Delaware
Filed Sept. 13, 1965, Ser. No. 486,737
2 Claims. (Cl. 136—170)

ABSTRACT OF THE DISCLOSURE

In a battery, a channel-like barrier adapted to grip the tops of a line of vented battery caps to facilitate the collection, and to control the direction of flow of acid mist emanating from the vents. The barrier comprises a top and resilient spaced-apart side walls. The spaced-apart side walls include inwardly curved portions adjacent the top and skirts flaring outwardly from the inwardly curved portion.

---

This invention relates to batteries and more particularly to batteries having vented fill caps.

In present battery constructions for automotive use and the like a plurality of vented fill caps are provided thereon to plug fill openings into the cells of the battery. Such caps have a baffled opening therein through which gases generated during the operation of the battery pass exteriorly of the cells. The gases include acid vapors or an acid mist that can create serious corrosion problems of portions of a vehicle located adjacent the battery.

Accordingly, an object of the present invention is to improve battery construction by the provision therein of an improved arrangement for isolating acid vapor emitted from the battery from selected points in the surrounding environment of the battery.

A further object of the present invention is to improve battery constructions by the provision therein of a vented fill cap enclosure that is directed across the top of a battery cover in surrounding relationship with vented fill caps thereon and wherein the enclosure includes flexible side walls that fit over the caps to secure the enclosure with respect thereto.

A further object of the present invention is to improve battery constructions by the provision therein of an economical acid vapor directing member that partially encloses the vent caps on a battery for concentrating and collecting the acid vapors emitted from the vent caps and for directing them to a point where their corrosive effect is minimized.

Still another object of the present invention is to improve battery constructions including a plurality of in line, spaced apart vented fill caps by the provision of a battery cover having spaced apart parallel rails formed therein that cooperate with an elongated channel-shaped cover member to prevent escape of acid vapors from the vented caps in predetermined directions therefrom wherein the cover includes side walls that are formed to be easily located in place around the caps and deflectable into engagement with the caps for removing said caps from the battery construction for inspecting the electrolyte level in the battery.

Further objects and advantages of the present invention will be apparent from the following description, reference being had to the accompanying drawings wherein a preferred embodiment of the present invention is clearly shown.

Figure 1:
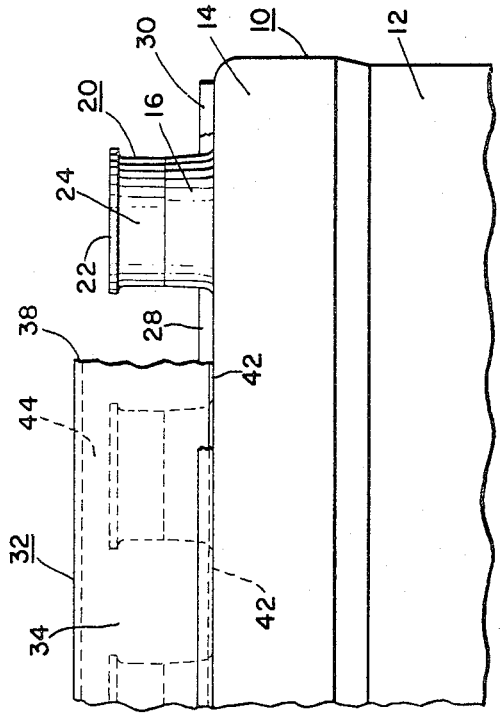
FIGURE 1 is a view in side elevation of the battery including the present invention.

Referring now to the drawing, in FIGURE 1 a battery 10 as illustrated including a casing 12 having a one-piece cover 14 secured on the top thereof. The cover 14 has a plurality of spaced apart upwardly directed tubular neck portions 16 formed thereon forming a fill opening 18 through which electrolyte can be passed into cells within the battery 10. Each of the fill openings 18 is plugged with a vented fill cap 20 including a radially outwardly directed rim 22 at the upper edge of a top portion 24 that has a depending stem 26 thereon which is located in sliding, sealing engagement with the inside surface of the tubular neck 16. The fill cap 20 has a baffled, interior opening (not shown) through the top portion 24. One suitable example of such a vent arrangement is shown in United States Patent No. 2,994,731, issued Aug. 1, 1961, whereby gases released during the operation of the battery 10 are vented from the battery 12 through the caps exteriorly thereof.

One problem with such battery constructions is that the vented gas escaping therefrom can produce an acid mist that is extremely corrosive to adjacent portions of an automobile or the like in which the battery is located. For example, in many cases, the battery is located immediately behind the front grill of an automobile and the escaping acid vapors from the battery will collect thereon to cause substantial damage.

In accordance with certain of the principles of the present invention, to obviate this problem, the cover 14 has a pair of spaced apart rails 28, 30 formed thereon extending completely across the length of the cover 14. The rails 28, 30 are raised a predetermined distance above the top surface of the cover 14 on either side of the row of in line fill neck portions 16 to collect condensed acid containing liquids therebetween to prevent such acidic material from flowing across the cover of the battery to contact adjacent portions of a vehicle in an undesirable manner.

Figure 2:
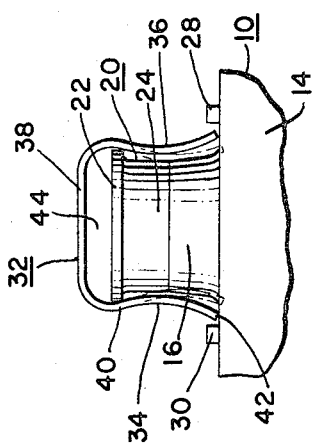
FIGURE 2 is a fragmentary view in end elevation of the present invention.

In addition to the rails 28, 30, the acid vapors from the fill caps 20 are blocked from adjacent portions of the vehicle by an improved acid barrier and directing member 32 that has an elongated, channel-shaped configuration extending across the battery and including side walls 34, 36 that are joined at their upper ends by a top portion 38. Each of the side walls 34, 36 is bent or convoluted inwardly from the top portion 38 at 40 to engage the radially outwardly directed rim 22 of the cap 20. From the point 40 in the side walls, they are curved outwardly so that a lower edge 42 thereon is located in close spaced relationship with the inside surface of the rails 28, 30, as best seen in FIGURE 2.

By virtue of this arrangement, the member 32 can be freely fitted over the in line caps 20 on the cover 14 whereby the caps 20, in cooperation with the top 38 and the side walls 34, 36, will form a space 44 in which acid vapors escaping from the battery 10 are collected. The space 44 in the illustrated arrangement is opened at either end thereof at the ends of the enclosure 32, but, if desired, a closure member can be included on the end of the enclosure 32 so that the space 44 is only opened at one end thereof whereby acid vapors can be selectively directed from the battery construction 10 so as to be passed into an adjacent region where there are no vehicle components or the like that might be undesirably affected by acid corrosion.

Figure 3:
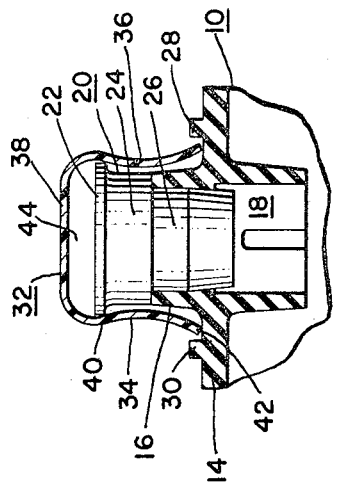
FIGURE 3 is an enlarged view in vertical section taken along the line 3—3 of FIGURE 1.

Another feature of the above-described arrangement is that the side members 34, 36 have a predetermined flexibility whereby a person can grip the sides of the member 32 and force them inwardly against the top 24 of the cap 20 whereby the inwardly curved portions 40 of the side members will underlie the rims 22 on the caps 20 to form an interlocking relationship that allows the closure member 32 to serve as a cap dislodging member merely by pulling it upwardly wtih respect to the top surface of the cover 14. In order to positively obtain the cap dislodging effect, the illustrated enclosure 32 may have the sides thereof reinforced to provide a deflection that will enhance the interlocking effect described above. If a proper relationship between the cap and the side walls of the enclosure is obtained, it is possible to dislodge or remove all of the caps simultaneously from the battery 10 in order to inspect electrolyte level therein. By inverting the enclosure 32, it serves as a tray from which the individual battery caps can be taken following inspection to be relocated within the fill neck portions 16, as shown in FIGURE 3.

While the embodiment of the present invention as herein disclosed constitutes a preferred form, it is to be understood that other forms might be adopted.

What is claimed is as follows.

1. In a battery construction comprising a cover, a plurality of electrolyte fill openings in said cover and a plurality of vented fill caps for said fill openings which fill caps include an upper head portion exterior of said openings, a one-piece elongated inverted substantially U-shaped channel-like member superposed over said fill caps to define an open-ended, acid vapor condensing and diverting channel for preventing the uncontrolled migration of battery acid vapor into the surrounding environment, the improvement comprising said channel-like member being in direct pinching engagement with said fill caps to retain said channel member in place over said caps, and comprising, a top portion and spaced-apart resilient side walls which form a pair of coacting jaws, said side walls each including an inwardly curved portion adjacent said top portion, and a skirt flaring outwardly from said inwardly curved portion and engaging said cover, said inwardly curved portion underlying a portion of said head, said flaring skirt serving to centrally align said channel-like member with respect to said fill caps and facilitate the spreading of said jaws during the engagement of said channel-like member with said fill caps.

2. The battery construction of claim 1 wherein said cover additionally has at least two spaced-apart rails extending across said cover on either side of said fill cap, said rails being located outside of said skirt to cooperate therewith to prevent an undirected escape of acid vapor and condensate from within said channel across said cover.

References Cited

UNITED STATES PATENTS

| | | | |
|---|---|---|---|
| 1,469,119 | 9/1923 | Stallings | 136—177 X |
| 3,081,373 | 3/1963 | Hughes | 136—177 |

FOREIGN PATENTS

| | | |
|---|---|---|
| 232,480 | 6/1959 | Australia. |
| 375,766 | 5/1962 | Switzerland. |
| 1,283,038 | 12/1961 | France. |

ALLEN B. CURTIS, *Primary Examiner.*

WINSTON A. DOUGLAS, *Examiner.*

D. L. WALTON, *Assistant Examiner.*